United States Patent
May

(10) Patent No.: US 11,326,866 B2
(45) Date of Patent: *May 10, 2022

(54) DIFFERENTIAL MAGNETIC PROXIMITY SENSOR

(71) Applicant: INFINITY ENGINEERED PRODUCTS, LLC, Fairlawn, OH (US)

(72) Inventor: Lutz May, Starnberg (DE)

(73) Assignee: Infinity Engineered Products, LLC, Fairlawn, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,878

(22) Filed: Oct. 5, 2020

(65) Prior Publication Data

US 2021/0140754 A1 May 13, 2021

Related U.S. Application Data

(63) Continuation of application No. 16/086,406, filed as application No. PCT/EP2017/056428 on Mar. 17, 2017, now Pat. No. 10,794,680.

(30) Foreign Application Priority Data

Mar. 22, 2016 (EP) .................................. 16161508

(51) Int. Cl.
*G01B 7/14* (2006.01)
*G01B 7/00* (2006.01)
(52) U.S. Cl.
CPC ............... *G01B 7/14* (2013.01); *G01B 7/003* (2013.01)

(58) Field of Classification Search
USPC ...................................... 324/207.18
See application file for complete search history.

(56) References Cited

U.S. PATENT DOCUMENTS

| 4,622,644 | A | 11/1986 | Hansen |
| 5,521,497 | A | 5/1996 | Schneider et al. |
| 5,646,525 | A | 7/1997 | Gilboa |
| 9,562,758 | B2 | 2/2017 | May |
| 10,794,680 | B2 * | 10/2020 | May ......................... G01B 7/14 |
| 2009/0128139 | A1 | 5/2009 | Drenth et al. |

(Continued)

FOREIGN PATENT DOCUMENTS

| DE | 10 2006 017 275 | 10/2007 |
| DE | 10 2008 064 647 | 2/2010 |

(Continued)

OTHER PUBLICATIONS

European Examination Report dated Aug. 22, 2019 for European Patent Application No. 17710574.9, 5 pages.

(Continued)

*Primary Examiner* — Rodney E Fuller
(74) *Attorney, Agent, or Firm* — Moses & Singer LLP

(57) ABSTRACT

A distance measuring device (100) is provided, comprising a first sensing module (110), a second sensing module (120), a reference device (130), and an evaluating module (140). The first sensing module and the second sensing module are arranged on a horizontal base line (150). Each one of the first and second sensing module is configured to detect the strength of a magnetic field (50) and each one of the first and second sensing module has a first sensing direction (y) and a second sensing direction (x).

12 Claims, 10 Drawing Sheets

(56) References Cited

U.S. PATENT DOCUMENTS

2012/0056616 A1    3/2012    May
2014/0124994 A1    5/2014    May
2017/0160071 A1    6/2017    May
2019/0101372 A1    4/2019    May
2019/0257637 A1    8/2019    May

FOREIGN PATENT DOCUMENTS

| EP | 0979988    | 2/2000  |
| EP | 1243898    | 9/2002  |
| EP | 1845278    | 10/2007 |
| EP | 2362189    | 8/2011  |
| EP | 2366972    | 9/2011  |
| EP | 2792995    | 10/2014 |
| WO | 2002043045 | 5/2002  |

OTHER PUBLICATIONS

EP14164615.8 Extended European Search Report dated Jul. 3, 2014, 7 pages.
PCT/EP2017/056428 International Search Report dated May 16, 2017.

\* cited by examiner

DIFFERENTIAL MAGNETIC PROXIMITY SENSOR

CROSS-REFERENCE TO RELATED APPLICATIONS

This application is a continuation of U.S. patent application Ser. No. 16/086,406, filed on Sep. 19, 2018, entitled "Differential Magnetic Proximity Sensor," which is a § 371 U.S. National Stage Application of International Patent Application No. PCT/EP2017/056428, filed Mar. 17, 2017, which claims priority to EP16161508 filed Mar. 22, 2016, both entitled "Differential Magnetic Proximity Sensor," the contents of each of which are hereby incorporated by reference in their entireties for all purposes.

TECHNICAL FIELD

The present technology relates to a distance measuring device which may be a distance measurement sensor, for example, and an air spring with such a distance measuring device.

TECHNICAL BACKGROUND

Height or distance measurement has a wide variety of possible applications. For instance, it is a parameter that frequently needs to be monitored to optimize the performance of various types of machinery and vehicles, such as automobiles, trucks, trains, agricultural vehicles, mining vehicles, construction vehicles, and the like. For instance, monitoring height and various distances can lead to reduced fuel consumption, improved comfort, reduced overall cost, extended product service life, and safety. In any case, the need to monitor such distance parameters may generally increase with sophistication of the device and the complexity of its features.

Virtually every aspect of complex machinery may need to be tightly monitored and controlled to attain maximum advantages. For instance, constant adaptations may be required to optimize the performances and efficiency of almost every moving part of the machinery. This typically needs to be done while the operational conditions in the environment of the equipment are subject to change and can change significantly over very short time frames. Changing environmental conditions are virtually always encountered by vehicle. In addition to this, vehicles frequently operate under changing conditions which can make monitoring a difficult challenge. For instance, monitoring suspension height by distance measurements between air spring components can yield useful information. However, the environment where the height measurement is being made can present a wide variety of challenges. For example, in measuring the height of a vehicle frame above the surface of a road, challenges are typically presented by road noise, dirt, dust, and vibrations which are normally present in the environment surrounding the vehicle where the measurement is being taken.

SUMMARY

There may be a need to reduce the effect of unwanted magnetic stray fields on the distance measurement using magnetic fields.

According to an aspect of the technology, a distance measuring device is provided. The distance measuring device comprises a first sensing module, a second sensing module, a reference device, and an evaluating module. The first sensing module and the second sensing module are arranged on a horizontal base line. Each one of the first and second sensing module is configured to detect the strength of a magnetic field and each one of the first and second sensing module has a first sensing direction and a second sensing direction. The reference device is movable with respect to the first sensing module and the second sensing module along a movement trajectory. The reference device comprises a magnetic field element configured to emit a magnetic field detectable by the first and second sensing module, wherein the first sensing module is configured to detect the magnetic field and to determine a first opening angle between the second sensing direction of the first sensing module and the position of the reference device as a result of the detected magnetic field strength at the first and second sensing directions, wherein the second sensing module is configured to detect the magnetic field and to determine a second opening angle between the second sensing direction of the second sensing module and the position of the reference device, wherein the evaluating module is configured to determine the distance between the base line and the reference device based on the first opening angle and the second opening angle.

In other words, the first and the second sensing modules are laterally offset with respect to the reference device and an opening angle can be detected between each one of the sensing modules and the reference device. These opening angles can be used to determine the distance between the sensing modules and the reference device. The first and second sensing modules are laterally offset along the horizontal base line. The vertical distance between each one of the sensing modules and the reference device is preferably the same. The vertical distance is the distance parallel to the measuring direction.

It should be understood that a movement of the reference device with respect to the sensing modules may be a relative movement between the sensing modules and the reference device and may mean that the reference device is moved while the sensing modules are standing still or that the sensing modules are moved while the reference device is standing still or that both, the sensing modules and the reference device are moved.

Due to the fact that the distance between the reference device and the sensing modules is determined based on the opening angles between the reference device and each one of the sensing modules, the effect of unwanted magnetic stray fields or interfering magnetic fields like for example the earth magnetic field may be reduced.

The first sensing module may have a first zero angle measurement axis point and the second sensing module may have a second zero angle measurement axis point. The horizontal base line preferably connects the first and second zero angle measurement axis points.

Preferably, the first sensing direction and the second sensing direction are substantially orthogonal to each other and preferably intersect at an angle between 20° and 100°. In a preferred embodiment, the first and second sensing directions intersect at 90°.

Preferably, the movement trajectory is perpendicular or substantially perpendicular to the horizontal base line.

According to an embodiment of the technology, the movement trajectory is linear and preferably an extension of the movement trajectory intersects with the base line, wherein the base line preferably is a virtual linear line interconnecting the first and second sensing modules.

In other words, the reference device moves towards and/or away from the sensing modules. This movement is referred to as a relative movement between said components.

According to a further embodiment of the technology, the movement trajectory intersects with the base line at a center point which is equidistant from the first sensing module and the second sensing module.

Hence, the first and second sensing modules are laterally offset with respect to the reference device (or with respect to a center point of the reference device) along the horizontal baseline such that the sensing modules have the same distance from the line of the movement trajectory or from the center of the reference device. In other words, the sensing modules of the distance measuring device are arranged symmetrical, i.e., axisymmetric, with respect to the movement trajectory.

According to a further embodiment of the technology, the first sensing module is arranged such that its second sensing direction is inclined with respect to the movement trajectory, and/or the second sensing module is arranged such that its second detection direction is inclined with respect to the movement trajectory.

Thus, the effect of magnetic stray fields, in particular uniform magnetic stray fields, can be cancelled by this arrangement of the sensing modules.

According to a further embodiment of the technology, the angle of inclination of the first sensing module is the same as the angle of inclination of the second sensing module. Hence, the first and second sensing modules point in the same direction, i.e., they are aligned to each other.

According to a further embodiment of the technology, the second sensing direction of the first sensing module and/or of the second sensing module is inclined with respect to the movement trajectory at an angle between 1° and 89°, preferably between 5° and 70°, more preferably between 10° and 45°.

According to a further embodiment of the technology, the second sensing direction of the first sensing module is parallel to the second sensing direction of the second sensing module.

According to a further embodiment of the technology, the evaluating module is configured to determine the absolute value of the difference between the first opening angle and the second opening angle and to determine the distance between the reference device and the base line based on said absolute value.

According to a further embodiment of the technology, the reference device comprises a first permanent magnet.

According to a further embodiment of the technology, the first permanent magnet has a magnetic pole axis which coincides with the movement trajectory. In other words, the magnetic pole axis is directed towards the sensing modules.

According to a further embodiment of the technology, the reference device additionally comprises a second permanent magnet, wherein the first permanent magnet and the second permanent magnet are located equidistantly spaced apart from a vertical center axis of the reference device.

The vertical center axis of the reference device may coincide with the movement trajectory.

According to a further embodiment of the technology, a virtual line interconnecting a magnetic pole axis of the first permanent magnet and a magnetic pole axis of the second permanent magnet is parallel to the base line.

This virtual line may be referred to as reference device line. Hence, the first and second permanent magnet may be laterally offset with respect to the vertical center axis of the reference device along the reference device line.

According to a further embodiment of the technology, a pole axis of the first permanent magnet and/or a pole axis of the second permanent magnet is inclined with respect to the movement trajectory at a first inclination angle and a second inclination angle, respectively.

In other words, the pole axis of the first permanent magnet and the second permanent magnet is not perpendicular with respect to the reference device line and the horizontal base line interconnecting the first and second sensing modules.

According to a further embodiment of the technology, an absolute value of the first inclination angle of the first permanent magnet is the same as an absolute value of the second inclination angle of the second permanent magnet.

According to a further embodiment of the technology, the first inclination angle is between 1° and 25°, preferably between 5° and 20°, more preferably between 10° and 15°, more preferably 15°.

According to a further aspect of the technology, an air spring is provided. The air spring comprises a first mounting plate, a second mounting plate, and a distance measuring device. The first mounting plate is adapted to be mounted to a chassis of a vehicle and the second mounting plate is adapted to be mounted to a wheel suspension. The distance measuring device is a device as described above and hereinafter. The first and second sensing modules are mounted to the first mounting plate, and the reference device is mounted to the second mounting plate, wherein preferably the air spring further comprises a flexible member, wherein the first mounting plate, the second mounting plate, and the flexible member define a pressurizable chamber, and wherein the first and second sensing modules and the reference device are situated within the pressurizable chamber.

These and other aspects of the present technology will become apparent from and elucidated with reference to the exemplary embodiments described hereinafter.

DETAILED DESCRIPTION

Figure 1:
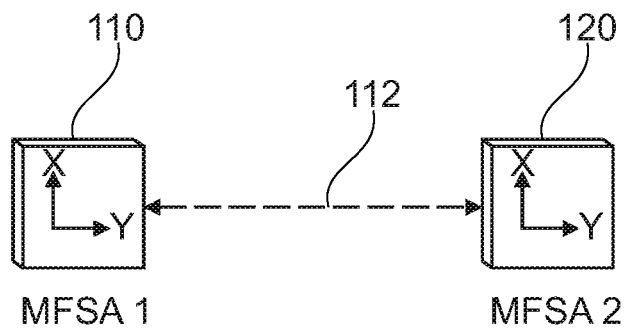
FIG. 1 schematically shows a first and a second sensing module.

For purposes hereof it should be understood that in referring to distances between two points the points are a first point (base point, or point from where the measurement will start, may be the first and second sensing modules as referred to above and hereinafter) and a second point (target point, may be the reference device as referred to above and hereinafter) to which the distance is measured. When aiming for a non-contact distance measurement solution, and when placing the distance sensing system at the base point, then the used measurement system has to be able to physically "detect", "feel", or "sense" the target point, in some way. There may be a multitude of fundamental different ways to accomplish this purpose. Some of these solutions can be optically based (such as visible light, and invisible light), sound based (for instance, audible and non-audible sounds) or physical based measurements. The measurement solution which is best suited for a specific application may depend on many factors, including: environmental conditions (interfering lights, interfering sound, changing ambient pressure, temperature, dust, and humidity), space availability for the measurement system, the targeted measurement range (millimeters, meters, kilometers), required measurement resolution and absolute accuracy, cost limitations, and the like.

In one embodiment, the herein described distance measurement solution is specifically directed to pneumatic powered, air-spring applications. It is applicable to the air springs which are employed in a wide variety of applications including, but not limited to machinery and vehicles, such as automobiles, trucks, trains, agricultural vehicles, mining vehicles, construction vehicles, and the like. Even though the following description refers to the specific application of air springs, it should be noted that this field of application is provided for purpose of example only and that the distance measuring device may also be used in connection with other applications.

The air-spring design to which this description is applicable includes a flexible member (an elastic rubber belly) that is mounted in an air-tight manner onto top and bottom plates to define an air tight (pressurizable) chamber. By pumping pressured air into the pressurizable chamber the air-spring will expand and by releasing the air from the pressurizable chamber the air-spring will begin to collapse. Usually mechanically controlled or electrically controlled pneumatic valves are used to change the amount of air within the pressurizable chamber of the air spring.

The total maximum distance that needs to be measured is equivalent to the working stroke range of the air-spring. The total working stroke of an air-spring is the difference in distance between when the air-spring is fully expanded (the maximal working length of the air-spring) and when the air-spring is fully contracted (the shortest possible working length of the air-spring). In other words, this working stroke is the changes in length of the air-spring when fully pumped-up (maximum practical air-volume within the air-spring belly) and when almost all of the air inside the air-spring has been pumped-out (lowest practical air-volume within the air-spring belly). The term "air" as used in this context includes any fluids, in particular gas or mixtures of gasses which is inert to the air spring and includes air, nitrogen, helium, other Noble gases, nitrogen enhanced air and helium enhanced air, for example. In particular, the term "air" when referring to an air spring may be understood as a synonym for any compressible gas.

For purposes hereof the targeted distance measurement is typically within the range of a few millimeters to around 500 millimeters or even more. The targeted measurement resolution and measurement repeatability is typically within the range of about 1 mm to 5 mm. It may be very inconvenient and may increase costs in scenarios where air-tight passages need to be tooled into the top or bottom plate of the air spring to accommodate electric cables for electric power supply or other purposes. Additionally, air-tight connectors of any type are expensive and will typically have an adverse effect on the reliability of the air-springs utilizing such technology.

The sensing solution of this description will operate on magnetic principles as they are not substantially affected by light, sound, air-pressure, dust, and/or humidity. The sensor system of this technology may be described as consisting three main parts: (1) the sensing module (or Magnetic Field Sensor Array), the sensor electronics, and the target-point. The sensing module and the sensing electronics are connected with each other by a number of insulated electrical wires (for example four wires can be utilized). The sensing module can be placed at the one end of the air-spring and can be referred to as the base-point. The sensor electronics can be powered by a low DC (direct current) voltage. The target-point or reference device may be a small and high strength permanent magnet. The physical dimension and the absolute surface-magnetic-field-strengths of the permanent magnet are subject to a number of application dictated parameters, including the measurement distance to be covered, available space, and environmental factors, including ferro-magnetic objects that may be situated near to the measurement path. For purposes hereof the "measurement path" is a vertical straight line between the target-point and the base point. In general, larger more powerful permanent magnets are needed with larger measurement distances with stronger surface-magnetic-field-strengths being required. In any case, the area around the measurement should be free of moving ferro-magnetic objects as they can interfere negatively with the distance measurement to be taken. However, within limits, static (not moving) ferro-magnetic objects can be tolerated with appropriate correction factors.

This description is focusing on non-contact proximity measurement using a magnetic principle based differential mode measurement solution.

The reference device referred to in this description may in particular be one or more permanent magnets. Thus, the reference device does not need any energy supply or any other external connections. However, due to aging of the permanent magnet, the distance measuring device may have to meet the following requirements: ability to deal with changes in the magnetic field strength (aging, low cost product); limited accuracy in the actual orientation of the North-South magnetic pole axis (when having to deal with low cost magnets, for example); ability of compensating the effects of interfering magnetic stray fields (like the Earth Magnetic Field); maximum freedom in the final placement of the actual sensing device and the reference device and not having to rely on strict geometrical (rectangular shaped) design requirements; simple measurement data processing (fast signal processing using low current, slow operating, and low cost processors).

In many distance measuring applications, the sensor system can be seen as a single axis (X) measurement system or as a two axes (X and Y, also referred to as "2D") measurement system. There are a few applications where the distance measurement system has to operate in a three axes environment (X, Y, and Z, also referred to as 3D). A three axis measurement system is more commonly referred to as a "position" sensor system.

The approach described here can be used for all three application types: Singe Axis, Dual Axes (2D), and Tripe Axes (3D, or position) Sensor Solutions. However, the design explanations in this document focus almost entirely on a Dual Axes Distance Measurement Sensor which, however, should not be understood as a limitation.

FIG. 1 shows two 2-Axis Magnetic Field Sensor Arrays (MFSA 1 and MFSA 2) which are referred to as a first sensing module 110 and a second sensing module 120 and which are placed side-by-side with some distance 112 to each other. The two 2D-MFSA devices, i.e., the first and the second sensing modules 110, 120, measure the magnetic vectors in the same plane. The output of each Magnetic Field Sensor Array is a vector that describes the magnetic field intensity measured and the angular direction from where the magnetic field measured is coming from. The angular direction may be understood as the position of the magnetic field source relative to each one of the first and second sensing module 110, 120 within the coordinate system spanned by the axes x and y indicated in FIG. 1. The axes x and y are also referred to as first sensing direction (y) and second sensing direction (x).

Figure 2:
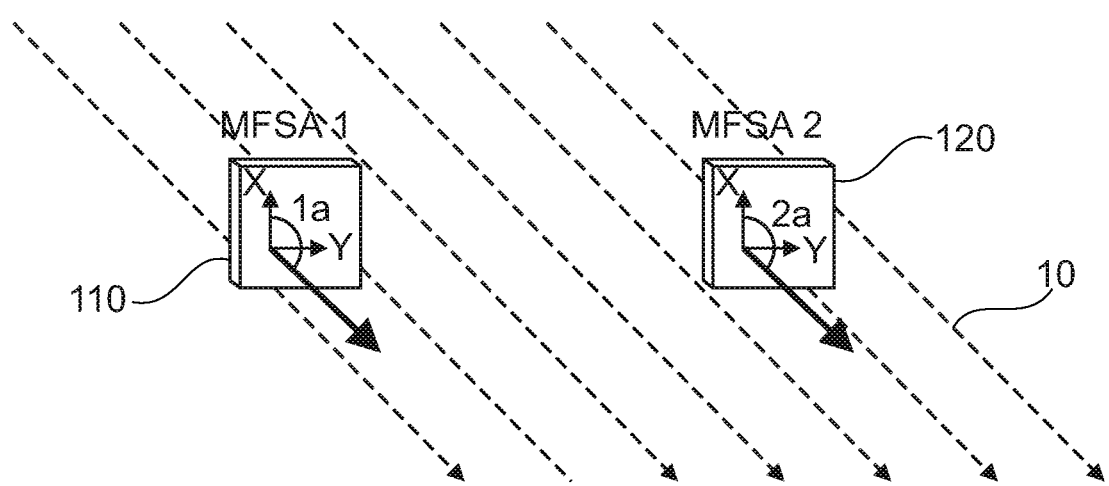
FIG. 2 schematically shows a first and a second sensing module arranged within a magnetic stray field.

FIG. 2 schematically indicates the effect of a uniform magnetic stray field (like the Earth Magnetic Field, indicated by dashed lines 10) that is hitting both MFSA devices 110, 120. In this case, both MFSA devices will report the same vector angle of the magnetic field passing by: The Angle 1a from the MFSA 1 will be identical to the Angle 2a, measured by the MFSA 2 device.

Angle 1a=Angle 2a

When subtracting the vector angle measurements from each other than the effect of the uniform magnetic stray field has been cancelled:

Angle 1a−Angle 2a=0

To achieve the cancellation effect and to avoid or eliminate any unwanted effects of the magnetic stray field on the measured distance it does not matter in which way the "zero" angle axis of the MFSA devices are pointing, as long as they are pointing in the same direction. In other words, the default orientation of the first and second sensing modules does not affect the cancellation in a negative manner as long as the sensing modules are oriented in the same direction.

Figure 3:
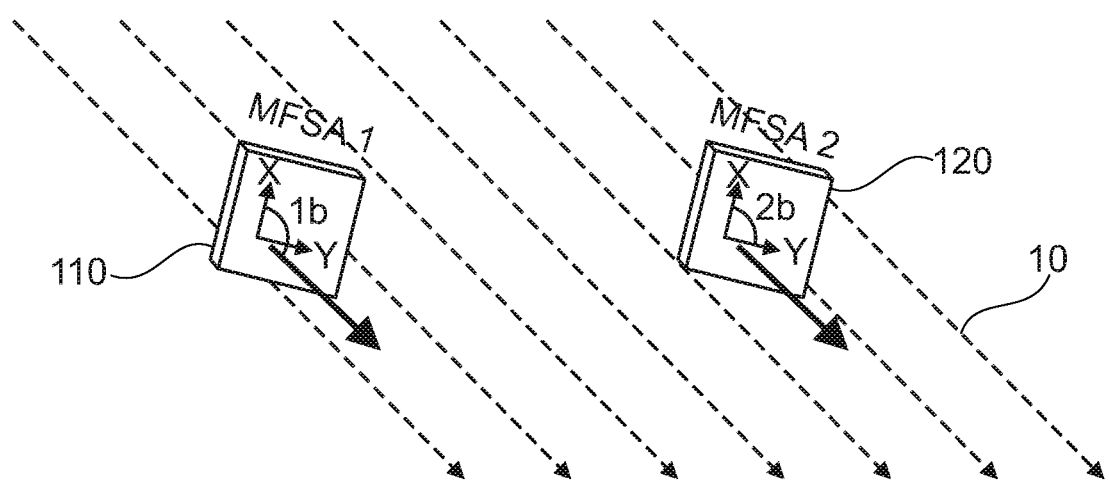
FIG. 3 schematically shows a first and a second sensing module arranged within a magnetic stray field.

As shown in FIG. 3, both sensing modules 110, 120 have been turned around in clock wise direction by a few degrees. However, the "zero" angle measurement axes (that may be one of the first sensing direction y and the second sensing direction x or any defined direction with reference to the first or second sensing direction) from both MFSA may point in the same direction, i.e., the first sensing direction of the first sensing module 110 is parallel to the first sensing direction of the second sensing module 120.

Due to the angular rotation of the sensing modules 110, 120 shown in FIG. 3 and compared to the sensing modules shown in FIG. 2, the absolute value of the angular measurement of the uniform magnetic stray field (Angle 1b and Angle 2b in FIG. 3) will now be smaller (in comparison to the earlier example, Angle 1a and Angle 2a in FIG. 2). However, angles 1b and 2b are identical again and when subtracting them from each other the remaining value will be zero. Meaning that the effect of the uniform magnetic stray field has been cancelled again.

Angle 1b−Angle 2b=0

This is the basic design concept of the differential magnetic field sensor device that will be used to measure the distance to the reference device. Further, the first and second sensing modules may be rotated in clockwise or counter-clockwise direction as to be adapted to the geometrical circumstances within an air spring. Therefore, the distance measuring device as described herein may be used in a flexible manner and may be adapted to various air spring designs.

Figure 4:
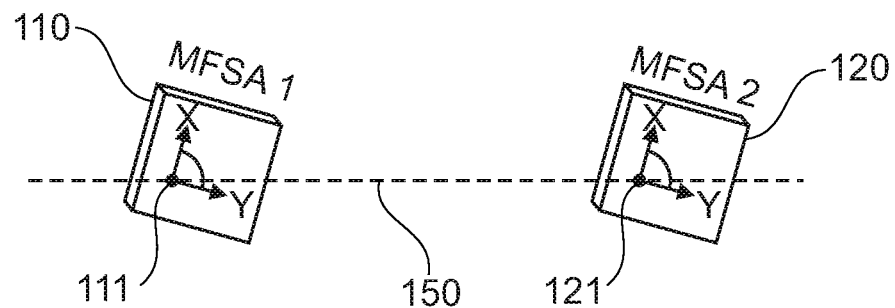
FIG. 4 schematically shows a first and a second sensing module.

FIG. 4 shows the first and second sensing modules 110, 120 with reference to the base line 150. The base line 150 is a virtual line which interconnects the magnetic zero-reference points 111, 121 of the sensing modules. The magnetic zero-reference point is the zero-point of the y-axis and of the x-axis, i.e., the cross-point of these axes. In other words, the sensing modules 110, 120 are positioned at the same height, i.e., their zero-reference point is at the height of the base line. The two magnetic field sensor arrays are oriented in the same direction. In other words, the y-axes of the first and second sensing modules intersect the base line 150 at the same angle. The same applies to the x-axes, since the x-axes typically intersect the y-axes at 90°. The zero-angle measurement axis of both sensing modules points into the same direction. The two magnetic measurement zero-point (magnetic zero-reference points 111, 121) of the sensing modules are connected by an imaginary line which is the base line 150.

Figure 5:
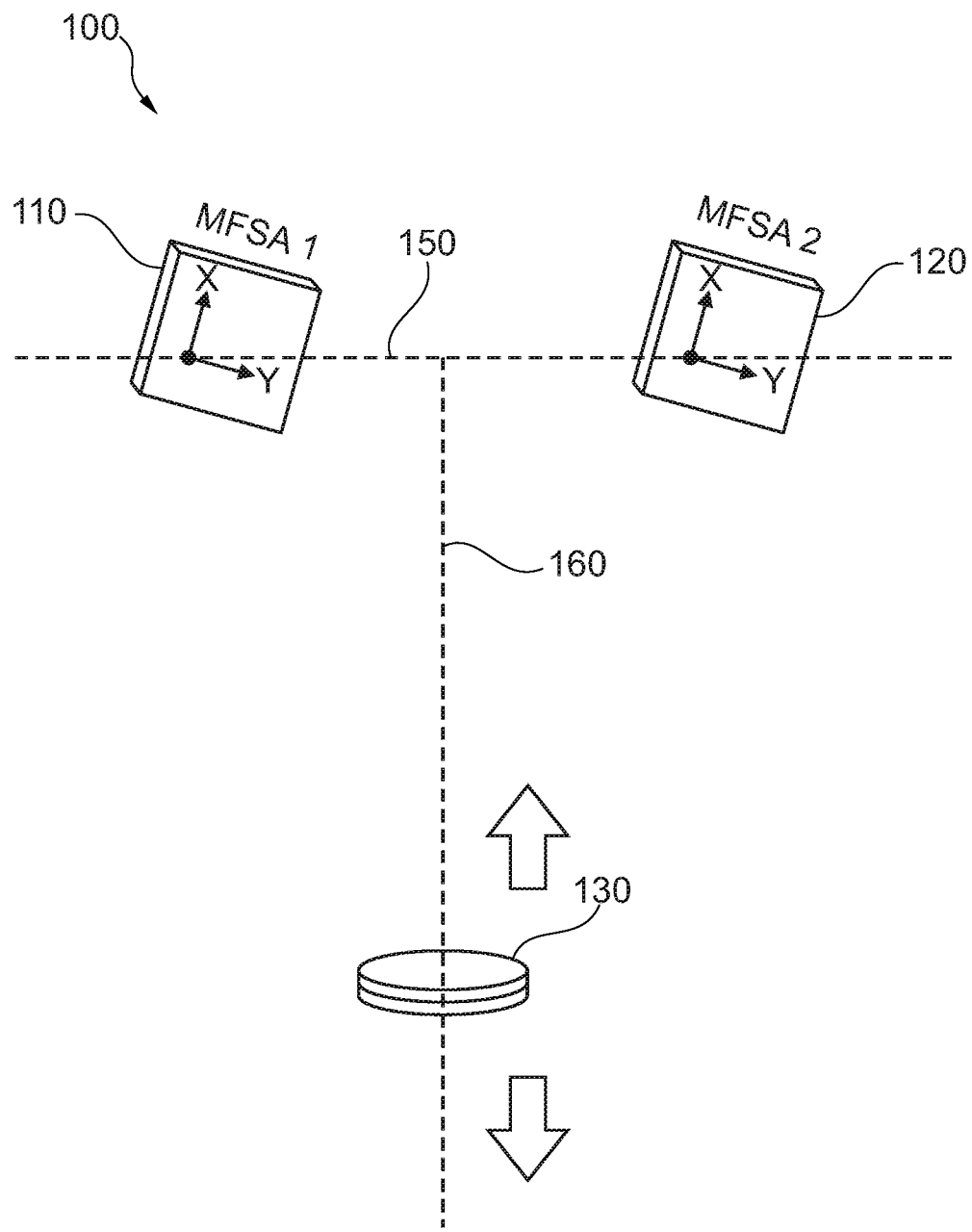
FIG. 5 schematically shows a distance measuring device according to an exemplary embodiment of the technology.

FIG. 5 shows a distance measuring device 100 with a first sensing module 110 and a second sensing module 120 which are positioned at the same height at the base line 150. A reference device 130 is arranged opposite to the sensing modules 110, 120 and is configured to move along a movement trajectory 160 towards and away from the sensing modules, as indicated by the arrows. The reference device is arranged between the two sensing modules, i.e., it has a lateral offset with respect to both sensing modules. In other words, the angular direction of the reference device with respect to any one of the sensing modules is neither 0° nor 90°, but some angle in between. Depending on the position of the reference device, i.e., the distance from the base line 150, the angles measured by the sensing modules vary. Based on the angular values measured by the sensing modules, the position of the reference device can be determined, and therefore, the distance between the reference device and the base line can also be determined.

The reference device will travel towards and away from the base line in a nearly perpendicular manner. The reference device may be a permanent magnet with its flux-lines facing towards the center of the two MFSAs. In other words, the central axis of the reference device is perpendicular to the base line and intersects the baseline at a point which is equidistant from the first and the second sensing module. The magnetic directions of the flux lines (North-to-South or South-to-North) does not affect the measurement performance of this sensor design. The same applies to the absolute signal magnetic field strengths of the reference device, which is also of little importance. However, the larger the magnetic field strength may be, the larger the measurement distance can be.

It should be noted that the actual movement of the reference device must not follow the linear movement trajectory shown in FIG. 5. The reference device may move on any kind of trajectory. However, the sensing modules will measure the distance of the reference device from the base line, which distance is the spacing along the linear movement trajectory.

The base line 150 interconnects the two sensing modules 110, 120. The axis or path of reference device 130 moving towards and away from the base line 150 is here called the movement trajectory 160 or trajectory line. One end of the trajectory line is connected to the base line. When using 2D (two axes) measuring MFSA's as the first and second sensing modules, then the movement path of the reference device (the movement trajectory) and the base line may have to be in the same two-dimensional plane.

Figure 6:
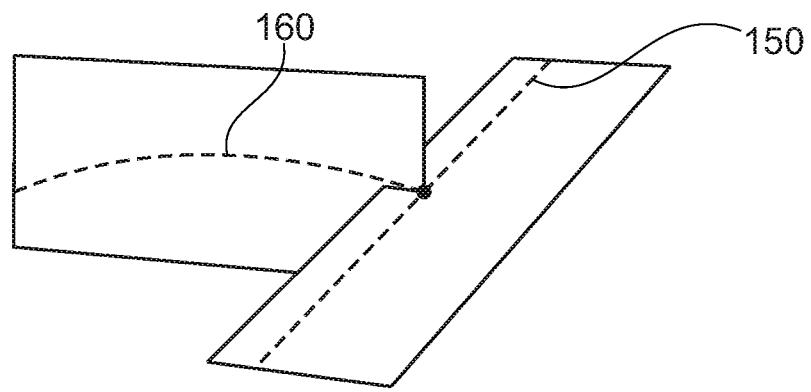
FIG. 6 schematically shows a movement trajectory of a reference device with respect to a base line in connection with a distance measuring device according to an exemplary embodiment of the technology.

However, when the reference device is not moving in a straight line towards and away from the base line, and when the plane in which the reference device is moving and/or the movement axis of the reference device is not in the same plane as used by the two MFSA's and it is required to determine not just the distance between the reference device and the base line but the exact positioning of the reference device with respect to the first and second sensing modules in the three-dimensional space, then the MFSA have to be able to measure in three axes (like 3D measuring MEMS, micro electro mechanical systems). This scenario is shown in FIG. 6. The plane in which the base line 150 is located and the plane in which the moving trajectory 160 is located are not the same but intersect at an angle unequal to 0°.

Figure 7:
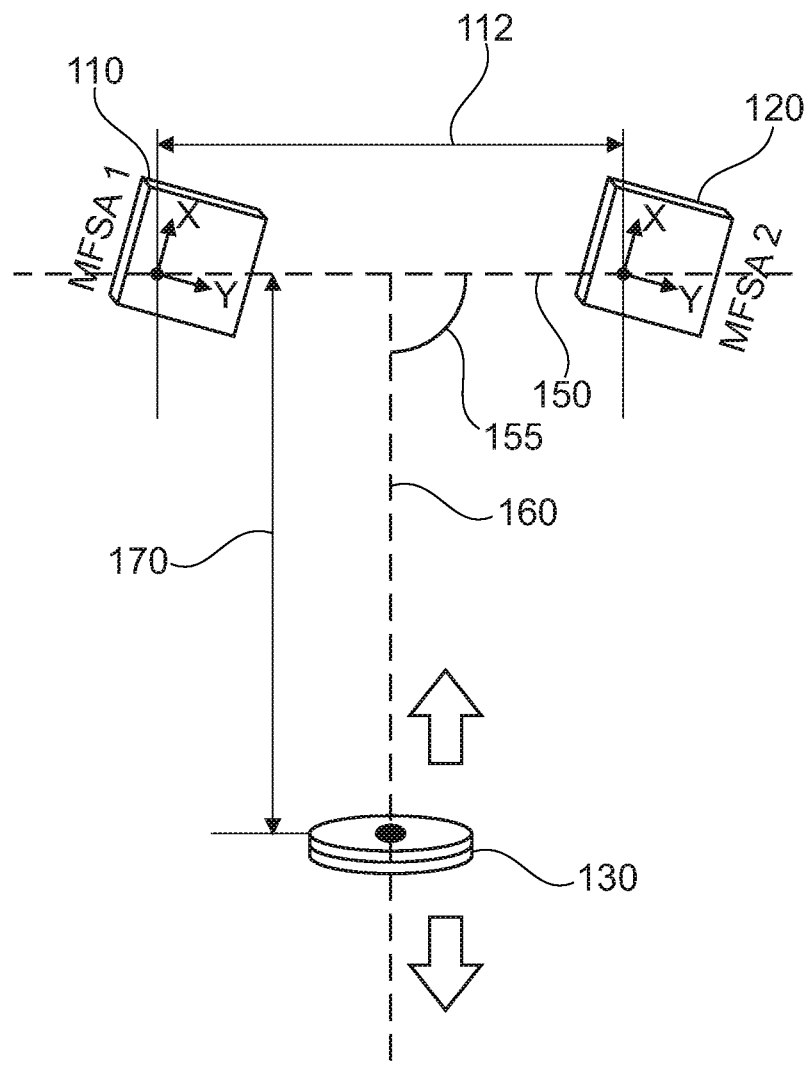
FIG. 7 schematically shows a distance measuring device according to an exemplary embodiment of the technology.

FIG. 7 shows an exemplary embodiment of a distance measuring device. The zero reference points of the two sensing modules 110, 120 are placed on the same base line 150. There is a distance 112 between the two zero reference points, while there is a measured (or calculated) distance 170 between the reference device 130 and the base line 150. The distance 170 is the measured distance or height.

The reference device is moving along the movement trajectory. This trajectory can be straight or can be curved. The end-point of the movement trajectory can end-up anywhere on the base line. However, when certain conditions are met, then the measurement signal processing can be very simple and does not require any complex trigonometric calculations. Simplified operational conditions of the reference device movement trajectory may be: the movement trajectory is a straight line (not curved in any direction) and ends perpendicular (in a 90 degrees' angle) onto the base line and the intersecting point of the movement trajectory and the base line is exactly halve way between the two sensing modules.

Figure 8:
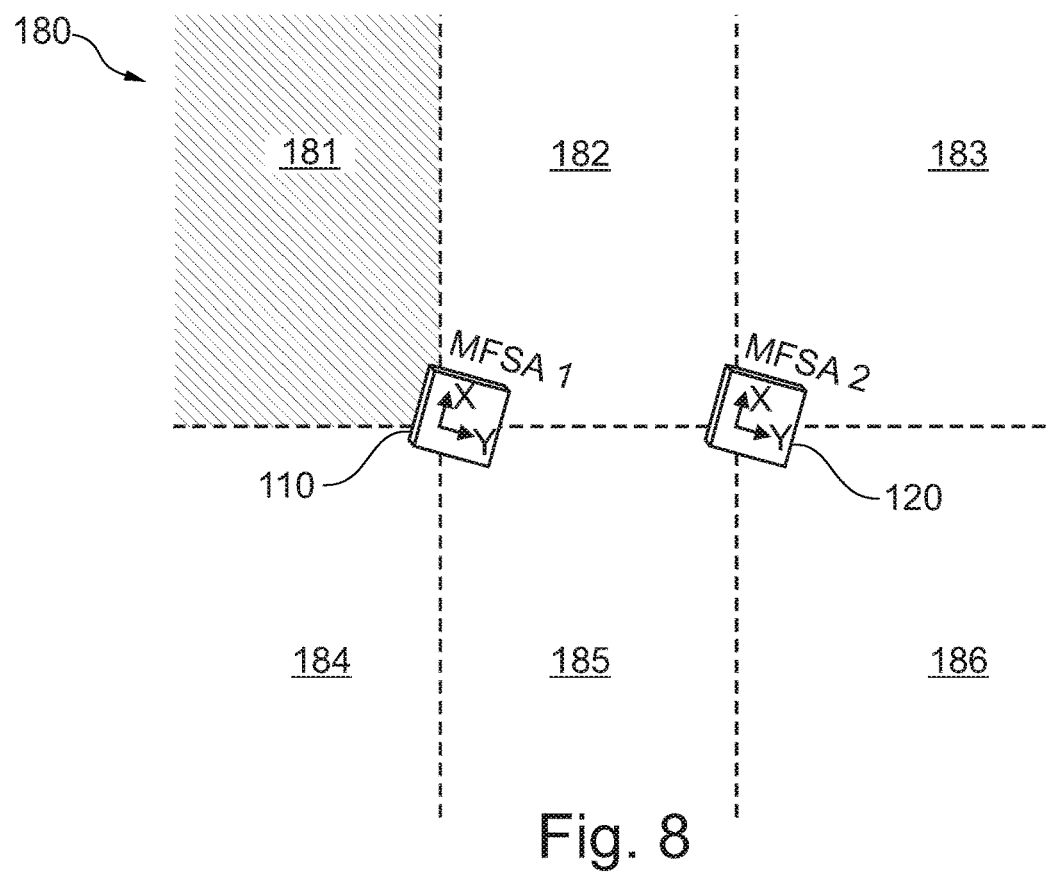
FIG. 8 schematically shows a first and a second sensing module of a distance measuring device according to an exemplary embodiment of the technology.

FIG. 8 schematically shows possible relative positions of the reference device with respect to the sensing modules.

The area around the two sensing modules 110, 120 can be divided in six rectangular shaped sections 181, 182, 183, 184, 185, 186 that lie in the same plane as the measurement plane of the sensing modules. The base line interconnecting the two sensing modules is building the central horizontal line between the sections 181, 182, 183 (above the base line) and the sections 184, 185, 186 (below the base line). As long as the reference device is moving within one and the same area (like, for example, in Area 181 which is marked in FIG. 8), the here described distance measuring device can determine the distance of the reference device to the base line.

The largest measurement range (longest achievable distance from the base line) may be achieved if the reference device is located in the sections 182 and 185.

Figure 9:
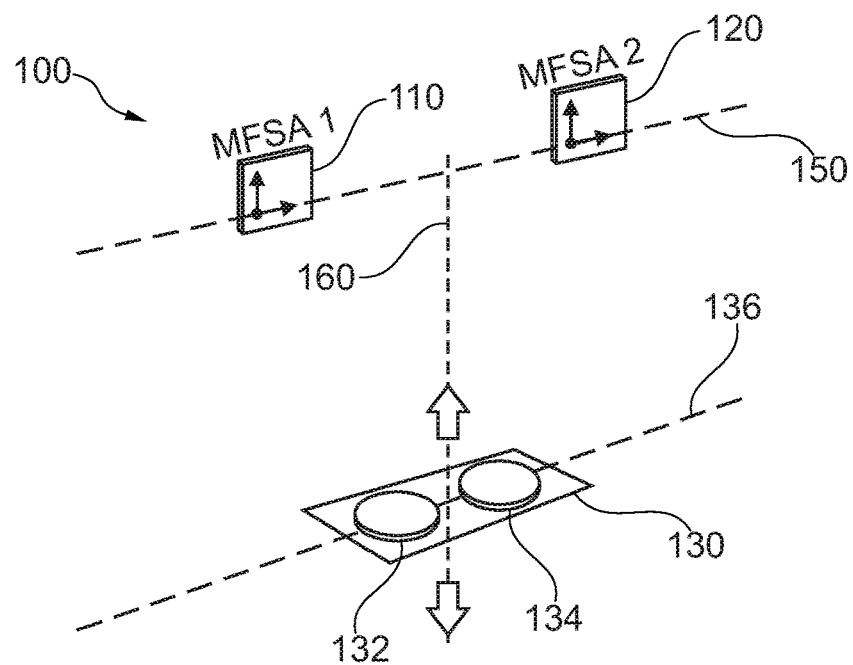
FIG. 9 schematically shows a distance measuring device according to an exemplary embodiment of the technology.

FIG. 9 shows a distance measuring device 100 with a reference device 130 having two permanent magnets 132 and 134. The absolute magnetic field strength and the physical size of the reference device may be some of the design parameters that influence the achievable measurement range. However, the measurement range may also be influenced by the sensitivity of the sensing modules and the distance between the sensing modules as well as by the magnetic interferences and/or the operational conditions.

The reference device may comprise a single permanent magnet or two permanent magnets. In the latter case, each one of the permanent magnets may be smaller compared to the single-magnet-solution. In particular, the measurement range may be extended by placing two permanent magnets side by side, as shown in FIG. 9.

The two permanent magnets 132 and 134 are arranged side by side along a reference device line 136 which preferably is parallel to the base line 150. The reference device line 136 interconnects the center of the permanent magnets 132 and 134. A central vertical axis of the reference device is equidistant to each one of the permanent magnets 132 and 134. This central vertical axis may preferably correspond to the movement trajectory and may intersect the base line 150 at a point which is equidistant to the sensing modules.

Figure 10:
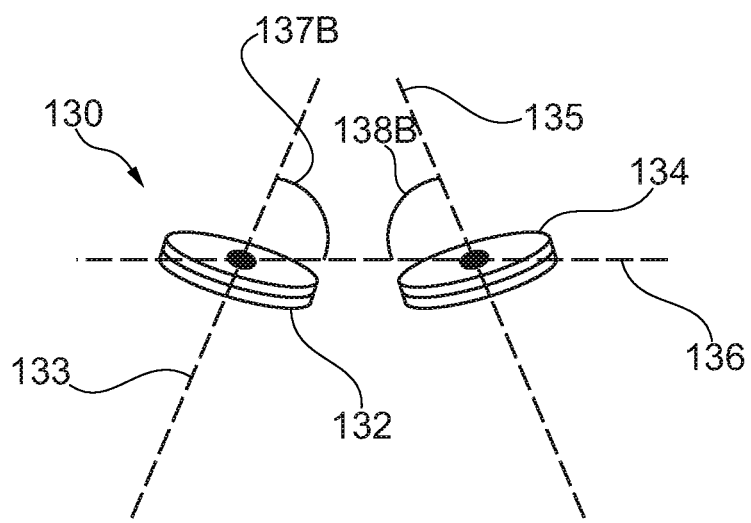
FIG. 10 schematically shows a reference device of a distance measuring device according to an exemplary embodiment of the technology.
Figure 11:
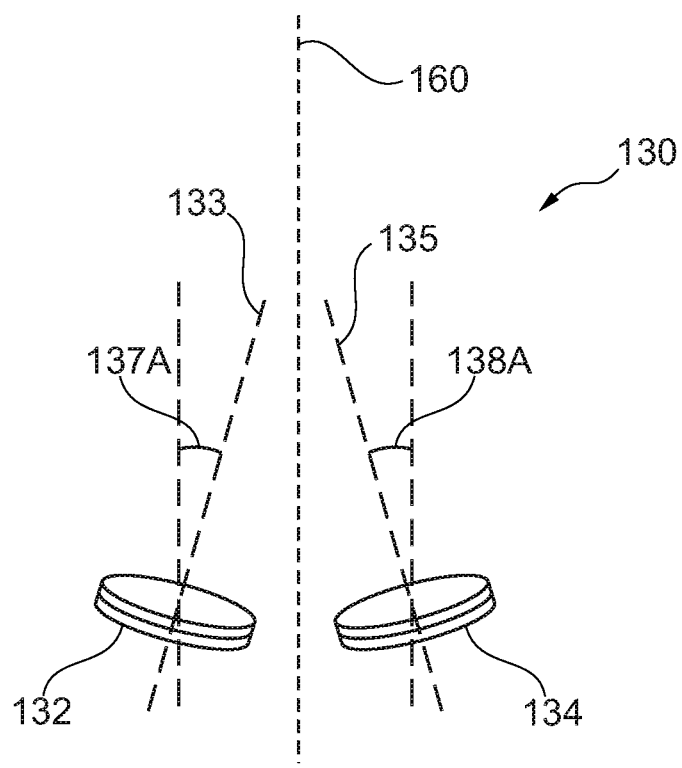
FIG. 11 schematically shows a reference device of a distance measuring device according to an exemplary embodiment of the technology.

FIGS. 10 and 11 show an additional approach which may increase the measurement range. The permanent magnets 132, 134 may be tilted with reference to the movement trajectory such that there is an angle 137A, 138A at which the central axes 133, 135 of the permanent magnets 132, 134 intersect with the movement trajectory 160 or angles 137B, 138B at which the central axes 133, 135 intersect with the reference device line 136.

Tilting the permanent magnets may help that the magnetic flux lines running towards the sensing modules extend even further. To achieve a symmetrical and straight line measurement curve, the two permanent magnets may have identical specifications (size and strength) and the angles of inclination may be of the same absolute value, but in the opposite direction, i.e., the magnets are inclined towards each other, as shown in FIGS. 10 and 11.

The inwards tilting may be done symmetrically. The optimal tilting level depends on the targeted measurement range, the physical magnetic strength of the permanent magnets, the height—diameter ratio of the actual magnet, and the distance between the two magnets. For most applications the suitable inwards tilting range (for each magnet) is from 0 degree to less than 20 degrees. Going beyond the upper tilting limit may rapidly reduce the distance sensor performances and therefore may be undesirable. The permanent magnets may be tilted by around 15 degrees, for example.

Figure 12:
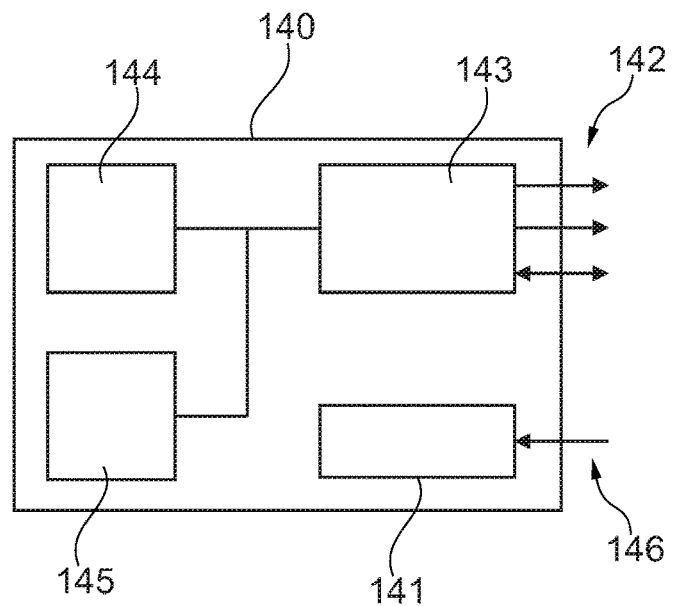
FIG. 12 schematically shows an evaluating module of a distance measuring device according to an exemplary embodiment of the technology.

FIG. 12 shows an evaluating module 140. The evaluating module 140 comprises two sensor array interfaces 144, 145 for interconnecting the first and the second sensing module. Further, the evaluating module 140 comprises a controller 143, for example a processor or any other kind of automated calculation unit, and a power supply unit 141. The power supply unit 141 may provide the evaluating module with electrical energy received from an energy source (not shown) via power interface 146. The control may send or receive data via an input/output (I/O) interface 142 which may comprise a serial digital I/O, an analogue I/O, and/or an interface to be connected to a data bus, for example a digital bus like CAN or CAN-Open.

The sensing modules are configured to provide the absolute magnetic field strength measured and the angle where this signal is coming from or is going to, i.e., the position of the magnetic field source. This information is transmitted to the evaluating unit 140 via the interfaces 144, 145.

The controller 143 will request the 2D Vector Signals of the measured magnetic field, whereby only the angular information may be of importance. Depending on the sensor system design the simplest form of signal processing may be applicable which is building the average of the two angle values provided by the two sensing modules and then apply a signal linearization procedure and a conversion from angular measurement in an actual distance value. Both can be done without any computation by using a lookup table. However, the calculation may also be done by the controller 143. The average angular value (Angle 1–Angle 2)/2 will be converted into a distance value by extracting this value from the lookup table or by calculating the value. The distance value depends on the angular values measured by the sensing modules and the distance between the two sensing modules.

Figure 13:
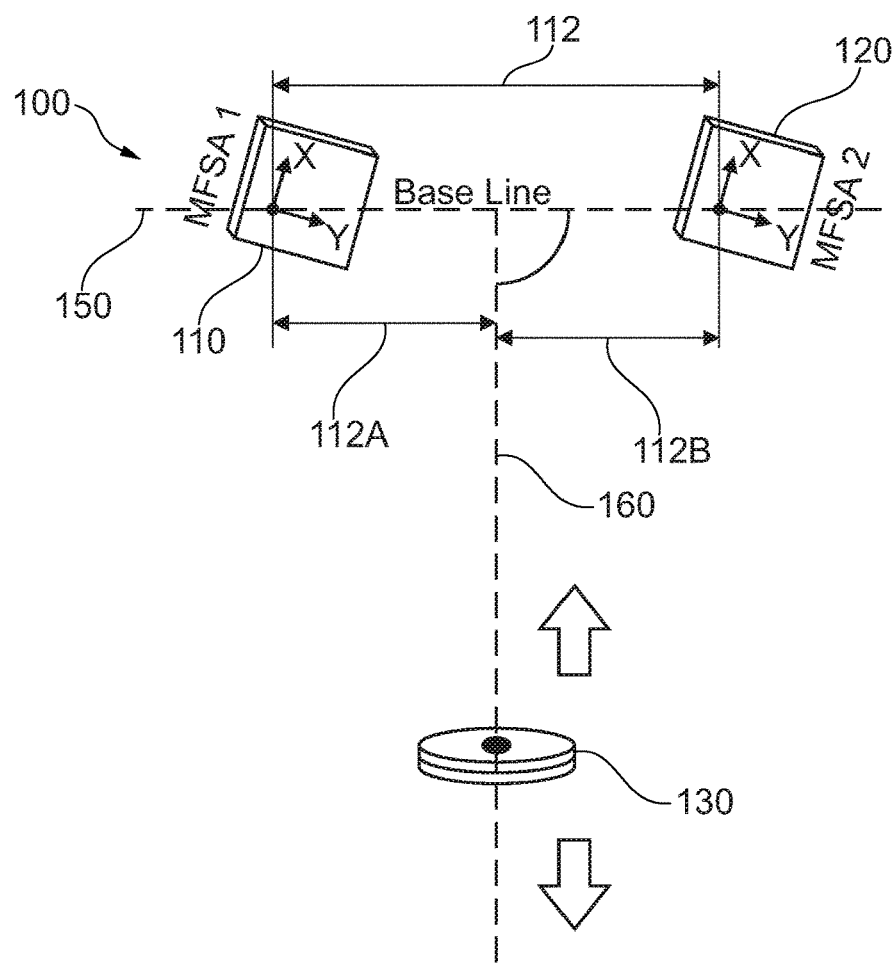
FIG. 13 schematically shows a distance measuring device according to an exemplary embodiment of the technology.

FIG. 13 exemplarily shows the approach of distance computation. A simple signal computation can be applied when the reference device 130 is moving on a straight line, i.e., when the movement trajectory 160 is linear and oriented in a nearly perpendicular fashion towards and away from the base line 150. The movement axis of the reference device will be nearly halve-way between the two sensing modules 110, 120. Thus, the distances 112A and 112B are the same and half of the distance 112.

When the reference device 130 is moving along the movement trajectory 160 then one of the easiest ways of computing the measurement data is: subtracting angle 1 from angle 2 (meaning the angles measured by the first and second sensing module) and using a lookup table to convert the resulting angle into a distance information.

As can be seen in FIG. 13, the first and second sensing directions of both sensing modules are inclined with respect to the movement trajectory and the base line at an angle unequal to 0° and 90°, respectively.

Figure 14:
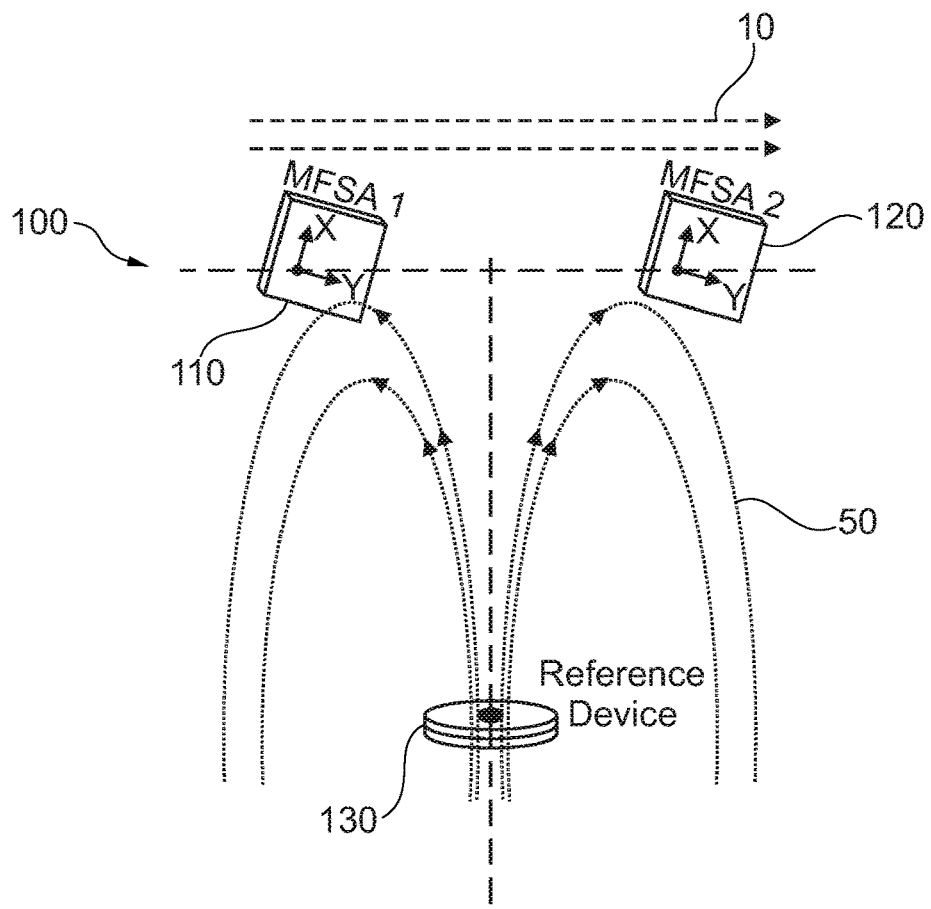
FIG. 14 schematically shows a distance measuring device according to an exemplary embodiment of the technology.

FIG. 14 shows the magnetic flux lines of the reference device 130. In one exemplary embodiment, the magnetic flux lines 50 generated by the reference device 130 are detected by the first and second sensing modules 110, 120 in opposite direction. In comparison, the magnetic flux lines 10 generated by uniform magnetic stray field source like the earth magnetic field are detected by the first and second sensing modules 110, 120 pointing in the same direction. That is why the differential mode will cancel the effects caused by uniform magnetic stray fields, and will not cancel the signal caused by the reference device.

Figure 15:
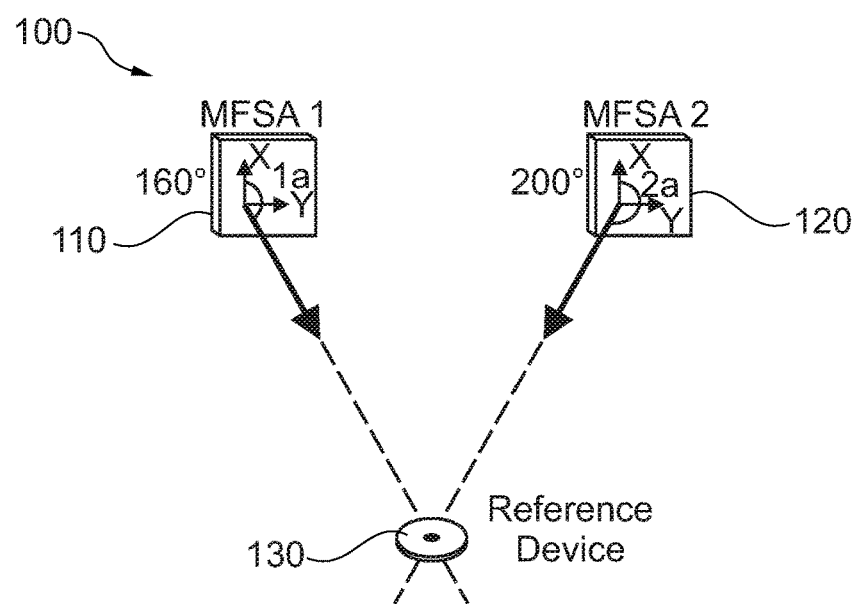
FIG. 15 schematically shows a distance measuring device according to an exemplary embodiment of the technology.

FIG. 15 shows a distance measuring device 100, wherein the angular values between the sensing modules and the reference device are schematically indicated.

In this schematic illustration, two different vector angles measured by the first sensing module 110) (160°) and measured by the second sensing module 120 (200°) are shown.

Angie 1a–Angle 2a=160°–200°=–40°

When subtracting the measured angles from each other (building the difference), then the remaining result is –40° in this example. This differential angular value is used as an indicator for the distance between the reference device and the base line.

Figure 16:
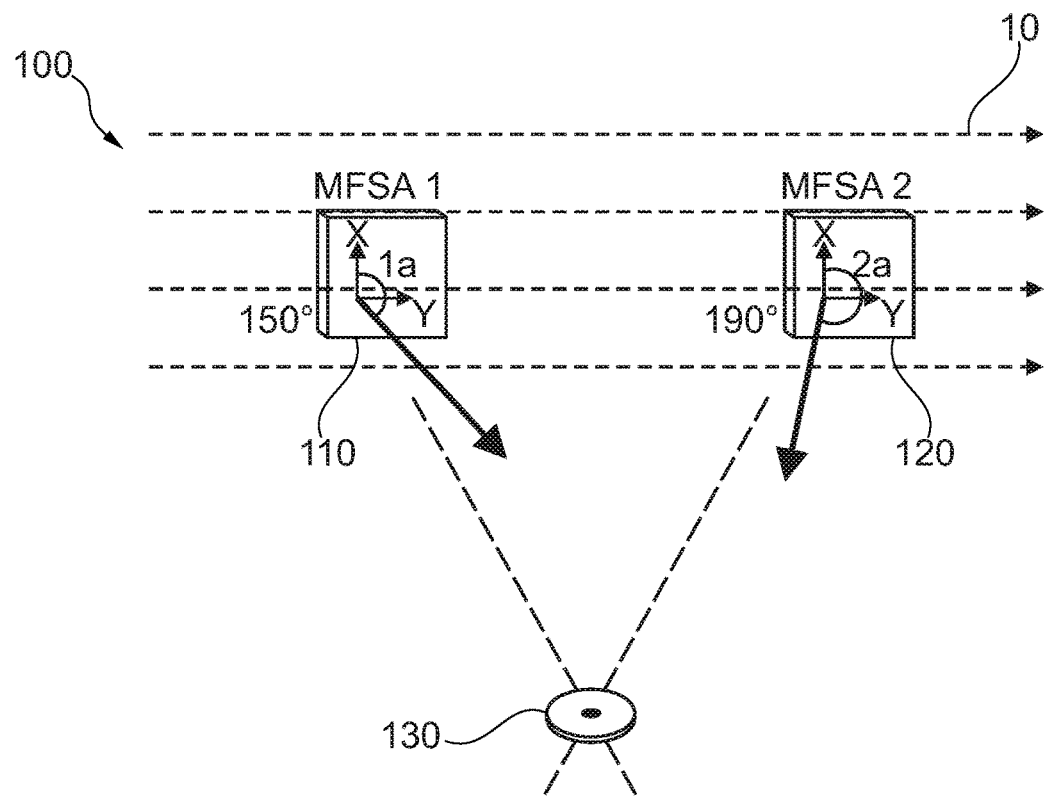
FIG. 16 schematically shows a distance measuring device according to an exemplary embodiment of the technology.

FIG. 16 schematically shows the effect of uniform magnetic stray fields on the angular measurement of the sensing modules 110, 120. Uniform magnetic stray fields 10 will affect the angle measurements of the magnetic field emitted by the reference device. Depending on the strength of the interfering stray field 10, the effect may be larger or smaller.

Starting from the values shown in FIG. 15, in the schematic illustration of FIG. 16 the reported angle measurements by the first sensing module 110 (150°) and by the second sensing module 120 (190°) have changed under the influence of the interfering magnetic stray field.

Angle 1a–Angle 2a=150°–190°=–40°

However, when applying the same mathematical process (building the difference) the remaining angle value is the same: –40°. In other words, the uniform magnetic stray field influences the measurement of both sensing modules in the same manner and will be eliminated when applying the differential mode.

The cancellation of uniform magnetic stray fields may work best when the reference device is in close range to the sensing modules. In any case, the here described differential mode signal processing is greatly reducing the unwanted effects from uniform magnetic stray fields.

Figure 17:
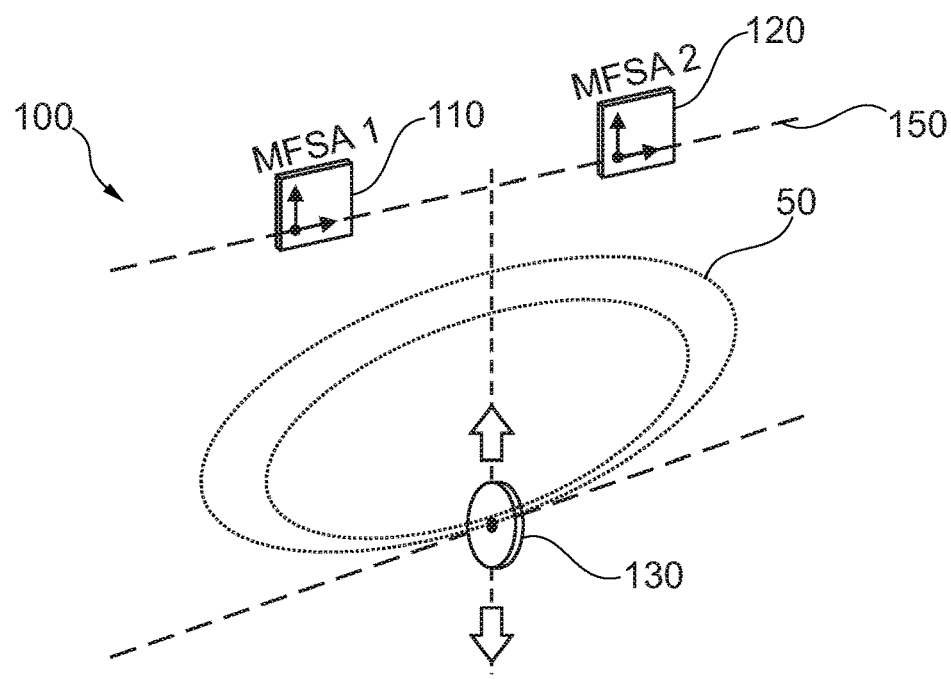
FIG. 17 schematically shows a distance measuring device according to an exemplary embodiment of the technology.

FIG. 17 shows a distance measuring device 100, wherein the reference device 130 is arranged in an alternative manner in comparison to the embodiment shown in FIGS. 13 to 16. The here described sensor system design will also function when the flux lines 50 run horizontally (parallel to the base line) through the reference device.

Some features of the distance measuring device described herein may be summed up as follows:

The magnetic field source (reference device) is defined by the physical dimensions of the reference device, in particular its height and width, and its absolute magnetic field strength. There may be one or more permanent magnets used as the magnetic field source. The sensing modules may be defined and described by the sensitivity of the individual magnetic field sensing devices and the absolute distance between the first and second sensing modules. The movement trajectory of the reference device may be perpendicular (or angled) with respect to the base line and may be arranged symmetrically (in the middle) between the first and second sensing module. The movement trajectory may be a straight line or a curved line and the reference device may stay within (or not within) the boundaries of one of the six possible sections 181 to 186. The interfering magnetic stray fields may be described by the magnetic field strength and by the uniformity/non-uniformity of the stray field.

In one preferred embodiment, the magnetic field source (reference device) comprises two permanent magnets, placed side-by-side, laterally offset and tilted with respect to the central axis of the reference device. The permanent magnets are of identical design and specifications and the physical dimensions may be defined by a height versus diameter ratio between <1 and >0.2. The sensing modules may be arranged such that the distance between the first sensing modules and the second sensing module is a function of the targeted measurement range and the specification of the reference device.

The distance measuring device may be used as a height sensor for air springs (in trucks, passenger cars, and other industrial applications), for determining valve positions, as manufacturing processing equipment, for determining a truck-trailer position (e.g., during the coupling process or as a steering assistance to avoid jack-knifing when driving a truck-trailer backwards), and/or for automatic object height measurement in sorting machinery.

It may be of little to no importance what the absolute magnetic field strength of the permanent magnet is. The measuring device described herein may be immune to any aging effect of the permanent magnet and enables measuring the distance in a non-contact fashion. The sensing modules can be 2D or 3D axes Hall-Effect solid state sensors with an analogue signal output or a serial digital bus interface (like I2C or SPI, for example). The measuring device enables much flexibility relating to the way the sensing modules and the reference device are placed relative to each other. This allows easy adaptation to different applications where space may be restricted. The space between the sensing modules and the reference device can be filled with any type of substance that has no Ferro-magnetic properties (including Aluminum, sand, wood, plaster, dust, water, oil, etc.). The magnetic flux-line orientation of the magnetic field source (in relation to the base line) can be any of the four possible directions: North-to-South, South-to-West, South-to-North, and West-to-East. However, best measurement performance and compensation for uniform magnetic stray fields may be achieved when the flux lines point towards the base line (solution North-to-South or South-to-North). The angular reference point (0° Angle) of the sensing modules can point in any direction as long as both do the same. There is no need for any calibration procedure.

Figure 18:
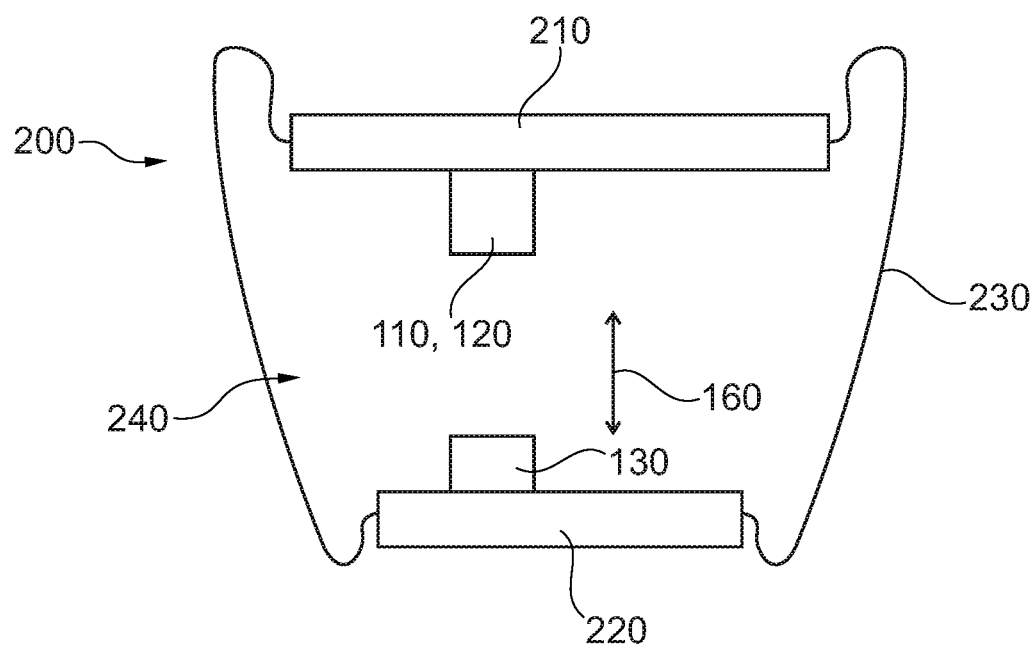
FIG. 18 schematically shows an air spring according to an exemplary embodiment of the technology.

FIG. 18 shows an air spring 200 with a first mounting element 210, a second mounting element 220, and a flexible member 230, for example a bellow. The first mounting element in form of a top plate, the second mounting element in form of a bottom plate, and the bellow contain or include a volume which is the pressurizable chamber 240. The first and second sensing modules 110, 120 are arranged at the first mounting element 210 and the reference device 130 is arranged at the second mounting element 220 opposite to the first mounting element. There is a relative movement of the mounting elements 210, 220 along the movement trajectory 160.

In an operating mode of the air spring, the top plate and the bottom plate may move towards each other along the direction arrow 160 by movements of the bottom plate and/or by movements of the top plate.

Figure 19:
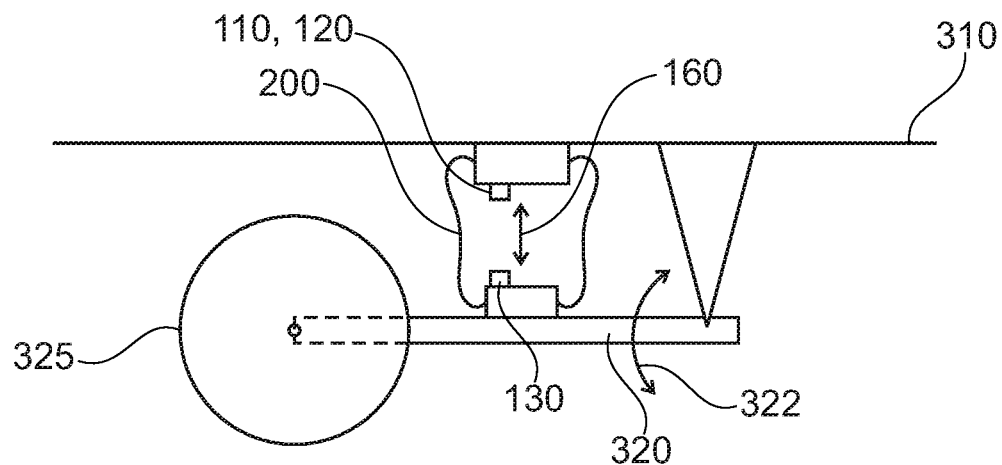
FIG. 19 schematically shows a wheel suspension with an air spring according to an exemplary embodiment of the technology.

FIG. 19 illustrates a wheel suspension 320 and a vehicle's chassis 310, which are mechanically linked to each other and have an air spring 100 for dampening vibrations of the wheel 325 due to uneven road conditions, wherein one of the mounting elements of the air spring is mounted to the wheel suspension 320 and the other one of the mounting elements of the air spring is mounted to the vehicle's chassis 310.

The wheel suspension 320 may move along the arrow 322 when the wheel rolls over an uneven street and, as a result of the vibrations of the wheel 325 and of the wheel suspension 320, the mounting elements of the air spring are moving frequently towards and away from each other as indicated by arrow 160. The air spring and in particular the pressurizable chamber within the air spring is adapted to dampen the vibrations of both the wheel suspension and the vehicle's chassis as to not transfer or transmit these vibrations from one of these parts to the other one, respectively.

It should be understood that the features described in individual exemplary embodiments may also be combined with each other in order to obtain a more fail safe air spring height sensor or air spring as well as to enable error detection and correction of the measured height signal. While certain representative embodiments and details have been shown for the purpose of illustrating the subject technology, it will be apparent to those skilled in this art that various changes and modifications can be made therein without departing from the scope of the subject technology.

LIST OF REFERENCE SIGNS 10 magnetic stray field
50 magnetic field generated by the reference device
100 distance measuring device
110 first sensing module
111 magnetic zero-reference point
112 distance between first and second sensing module
120 second sensing module
121 magnetic zero reference point
130 reference device
132 permanent magnet
133 central axis
134 permanent magnet
135 central axis
136 reference device line
137 angle of inclination
138 angle of inclination
140 evaluating module
141 power supply unit
142 I/O interface
143 controller
144 sensor array interface
145 sensor array interface
146 power interface
150 base line
155 angle between base line and movement trajectory
160 movement trajectory
170 measured distance
180 measurement plane
181 first section
182 second section
183 third section
184 fourth section
185 fifth section
186 sixth section
y first sensing direction
x second sensing direction
1a first opening angle
2a second opening angle
200 air spring
210 first mounting plate
220 second mounting plate
230 flexible member
240 pressurizable chamber
310 chassis
320 wheel suspension
322 suspension movement
325 wheel

What is claimed is:

1. An air spring comprising:
   a first mounting plate,
   a second mounting plate,
   a flexible member,
   wherein the first mounting plate, the second mounting plate, and the flexible member define a pressurizable chamber,
   a distance measuring device which comprises,
   a first sensing module mounted to the first mounting plate, situated within the pressurizable chamber, and having a first zero angle measurement axis point,
   a second sensing module mounted to the first mounting plate, situated within the pressurizable chamber, and having a second zero angle measurement axis point,
   a reference device mounted to the second mounting plate and situated within the pressurizable chamber,
   an evaluating module,
   a horizontal base line connecting the first zero angle measurement axis point and the second zero angle measurement axis point,
   wherein each one of the first and second sensing module is configured to detect the strength of a magnetic field in a first sensing direction and a second sensing direction,
   wherein the reference device is movable with respect to the first sensing module and the second sensing module along a movement trajectory,
   wherein the reference device is movable towards and away from the horizontal base line,
   wherein the reference device emits a magnetic field detectable by the first and second sensing module,
   wherein the first sensing module is configured to detect the magnetic field and to determine a first opening angle between the second sensing direction and the position of the reference device as a result of the detected magnetic field strength,
   wherein the second sensing module is configured to detect the magnetic field and to determine a second opening angle between the second sensing direction and the position of the reference device,
   wherein the second sensing direction of the first sensing module and/or of the second sensing module is inclined with respect to the movement trajectory at an angle between 1° and 89°,
   wherein the second sensing direction of the first sensing module is parallel to the second sensing direction of the second sensing module,
   wherein the evaluating module is configured to determine the distance between the horizontal base line and the reference device based on the first opening angle and the second opening angle.

2. The air spring of claim 1,
   wherein the movement trajectory is linear, wherein an extension of the movement trajectory intersects with the base line, and wherein the base line is a virtual linear line interconnecting the first and second sensing modules.

3. The air spring of claim 2,
   wherein the movement trajectory intersects with the base line at a center point, wherein the center point is equidistant from the first sensing module and the second sensing module.

4. The air spring of claim 2,
   wherein the first sensing module is arranged such that its second sensing direction is inclined with respect to the movement trajectory, and/or
   wherein the second sensing module is arranged such that its second sensing direction is inclined with respect to the movement trajectory.

5. The air spring of claim 1,
   wherein the evaluating module is configured to determine an absolute value of the difference between the first opening angle and the second opening angle and to determine the distance between the reference device and the base line based on said absolute value.

6. The air spring of claim 1,
   wherein the reference device comprises a first permanent magnet.

7. The air spring of claim 6,
   wherein the first permanent magnet has a magnetic pole axis which coincides with the movement trajectory.

8. The air spring of claim 6,
   wherein the reference device further comprises a second permanent magnet,
   wherein the first permanent magnet and the second permanent magnet are located equidistantly spaced apart from the movement trajectory.

9. The air spring of claim 8,
   wherein a virtual line interconnecting a magnetic pole axis of the first permanent magnet and a magnetic pole axis of the second permanent magnet is parallel to the base line.

10. The air spring of claim 8,
    wherein a pole axis of the first permanent magnet and/or a pole axis of the second permanent magnet is inclined with respect to the movement trajectory at a first inclination angle and a second inclination angle, respectively.

11. The air spring of claim 10,
    wherein an absolute value of the first inclination angle of the first permanent magnet is the same as an absolute value of the second inclination angle of the second permanent magnet.

12. The air spring of claim 10,
    wherein the first inclination angle is between 1° and 25°.

* * * * *